US008326447B2

(12) United States Patent
Sidner et al.

(10) Patent No.: US 8,326,447 B2
(45) Date of Patent: Dec. 4, 2012

(54) ADVANCED PLANNING SYSTEM

(75) Inventors: Michael J. Sidner, Dublin, OH (US);
Susan K. Whetsel, Bellefontaine, OH
(US); Neil Vining, Ostrander, OH (US);
Stephen L. Prine, Ostrander, OH (US)

(73) Assignee: Honda Motor Co., Ltd., Tokyo (JP)

( * ) Notice: Subject to any disclaimer, the term of this patent is extended or adjusted under 35 U.S.C. 154(b) by 307 days.

(21) Appl. No.: 12/771,236

(22) Filed: Apr. 30, 2010

(65) Prior Publication Data
US 2011/0270429 A1   Nov. 3, 2011

(51) Int. Cl.
*G06F 19/00* (2006.01)
(52) U.S. Cl. .......................... 700/95; 700/115
(58) Field of Classification Search .................. 700/97, 700/99, 100, 115, 214; 29/407.1, 458, 469, 29/701; 705/28, 40
See application file for complete search history.

(56) References Cited

U.S. PATENT DOCUMENTS

| | | | | |
|---|---|---|---|---|
| 6,141,598 A * | 10/2000 | Nam | ............................... | 700/95 |
| 6,415,266 B1 * | 7/2002 | Do | ................................ | 705/28 |
| 6,889,106 B2 | 5/2005 | Wei | | |
| 6,898,472 B2 * | 5/2005 | Crampton et al. | ............. | 700/97 |
| 6,920,365 B2 | 7/2005 | Chao et al. | | |
| 7,035,704 B2 | 4/2006 | Lee | | |
| 7,123,976 B2 | 10/2006 | Chen et al. | | |
| 7,130,707 B2 | 10/2006 | Chao et al. | | |
| 7,142,937 B1 | 11/2006 | Chin et al. | | |
| 7,200,389 B2 * | 4/2007 | Date et al. | ..................... | 455/419 |
| 7,406,359 B2 | 7/2008 | Roumeliotis et al. | | |
| 7,409,356 B1 * | 8/2008 | Geddes et al. | ............... | 705/7.25 |
| 7,499,766 B2 * | 3/2009 | Knight et al. | ................. | 700/107 |
| 2003/0149608 A1 | 8/2003 | Kall et al. | | |
| 2003/0177050 A1 * | 9/2003 | Crampton et al. | ................ | 705/8 |
| 2005/0052352 A1 * | 3/2005 | Huang et al. | .................... | 345/60 |
| 2006/0074778 A1 | 4/2006 | Katou et al. | | |
| 2006/0224263 A1 | 10/2006 | Arai | | |
| 2008/0033586 A1 | 2/2008 | Chang et al. | | |
| 2008/0154660 A1 * | 6/2008 | Steinbach et al. | ................ | 705/7 |
| 2009/0248186 A1 | 10/2009 | Hamling | | |
| 2009/0271019 A1 | 10/2009 | Wang et al. | | |

FOREIGN PATENT DOCUMENTS

JP              964510          3/1997

* cited by examiner

*Primary Examiner* — Kidest Bahta
(74) *Attorney, Agent, or Firm* — Rankin Hill & Clark LLP

(57) ABSTRACT

An advanced production planning system for allocating production capacity to meet a demand includes a demand receiver, a demand consolidator, a capacity balancer, and a planning module. The demand receiver is configured to receive input demand data and is in communication with the demand consolidator, calculates a consolidated demand as a sum of all input demand data. The capacity balancer calculates and stores a production capacity, and the planning module creates a production plan by allocating production capacity to meet the consolidated demand based on the consolidated demand and the production capacity.

20 Claims, 11 Drawing Sheets

Fig. 10

ADVANCED PLANNING SYSTEM

BACKGROUND

The present disclosure is directed to an advanced planning system, more particularly to an advanced production planning system, and even more particularly, to an advanced production planning system for use in an automotive production operation. With respect thereto, large production companies may have complex and varied operational and planning needs. For example, different departments may be required to receive and forecast sales demands, purchase necessary production parts, arrange for the transport of the production parts, produce finished products from the production parts, and arrange for the transport of the finished products to sales locations. As a result of the size and geographical diversity of these various departments, personnel working in each of the various departments generally work autonomously from the other departments. Further, personnel staffing each of the departments may work autonomously from other personnel staffing the same department.

Assuming an automotive production operation as the large production company, a sales department may be staffed with sales analysts and other staff that respond to an existing vehicle sales demand and forecast a future sales demand. Though the sales analysts and other sales staff all work under the sales department, the sales department may have various sub-departments, each tasked with responding to separate existing vehicle sales demands and forecasting separate future sales demands. The sales sub-departments may be geographically or operationally separate from each other so as to operate on a nearly autonomous level with respect to each other. Similarly, logistics and purchasing departments may also have various sub-departments that operate on a nearly autonomous level with respect to each other for several of the same reasons that the various sales sub-departments do.

With respect to the production of vehicles, several production or manufacturing facilities are likely to exist, with each of the production facilities charged with producing certain product types or vehicles for shipment to certain geographical areas in response to existing and forecasted sales demands. The various production facilities, due to geographical and operational reasons, may operate autonomously from each other. Further, the production facilities may also operate autonomously from the sales, logistics, and purchasing departments.

Accordingly, sales department personnel determine and enter existing and forecasted sales demands, which are then handed-off to the purchasing and logistics departments and the production facilities. Each constituent member may then acts autonomously to purchase necessary parts, transport production parts and finished vehicles, and produce the vehicles. As such, planning associated with the various levels of production is undertaken by each of the constituent members, and often by sub-departments of each of the constituent members, separately.

In sum, conventional large-scale production operations lack integration between the various departments and facilities charged with producing and selling the vehicles or other products. This lack of integration precludes the creation of an integrated production plan among the various constituent members, leading each constituent member to create a separate plan based on a handed-off plan. Though each constituent member may establish an optimized plan for their needs, such a system precludes the creation of a plan that optimizes planning across the entire system. Moreover, as the planning for any one department or facility is predicated on receiving a higher-level plan from another department or facility, planning may need to be undertaken for a finite time period, such as one-month, rather than for a longer time range. In view of the above circumstances, many production planning inefficiencies exist which preclude the ability to establish a flexible and integrated production plan across the various departments of a production operation.

SUMMARY

In view of the above-described problems and/or shortcomings associated with production planning systems, a production planning system according to the present disclosure allocates production capacity to meet a demand, and comprises: a demand receiver; a demand consolidator; a capacity balancer; and a planning module. The demand receiver is configured to receive an input demand data. The demand consolidator communicates with the demand receiver and receives the input demand data and calculates a consolidated demand which is a sum of input demand data. The capacity balancer calculates and stores a production capacity, and the planning module creates a production plan by allocating production capacity to meet the consolidated demand based on the consolidated demand and the production capacity.

According to another aspect, a production planning system for allocating production capacity to meet a demand includes an operational module and a planning module. The operational module receives demand inputs, sums the demand inputs into a consolidated demand, and creates a production plan. The planning module comprises a data retriever, a simulated data handler, and a simulating planner. The data retriever retrieves and stores consolidated demand and capacity data from the operational module. The simulated data handler receives the simulated demand input and creates a simulated consolidated demand by adding the simulated demand input to the retrieved consolidated demand data. The simulating planner creates a simulated production plan based on the simulated consolidated demand.

According to yet another aspect, a method for production planning is disclosed herein. The method includes receiving input demand data, calculating a consolidated demand by summing all input demand data, and creating a production plan by allocating production capacity to meet the consolidated demand based on the production capacity and the consolidated demand.

According to a further aspect, a method for simulating advanced production planning is disclosed herein. The method includes retrieving operational data from an operational module. The operational module receives demand inputs, calculates a consolidated demand from the demand inputs, calculates and stores a production capacity, and creates an operational production plan. The retrieved operational data is stored in a simulating database. Simulated demand input values are received, and a simulated consolidated demand based on the consolidated demand retrieved from the operational module and the received simulated demand input is calculated. A simulated production plan is then created by allocating production capacity to meet the simulated consolidated demand.

BRIEF DESCRIPTION OF THE DRAWINGS

FIG. 10 is an exemplary display output illustrating balancing results for parts.

DETAILED DESCRIPTION

A production planning system will be described herein with reference to the appended figures. The description with reference to the figures is made to exemplify the disclosed production planning system, and is not intended to limit the production planning system to the representations made in the figures. Specifically, description with reference to the figures is intended only to simplify and facilitate the understanding of the subject production planning system for a person of ordinary skill in the art. Such description with reference to the figures is not to be interpreted as limiting the scope of the production planning system beyond the limitations set forth in the appended claims.

A production planning system 100 disclosed herein is provided with an aim toward fully integrating production planning among various departments so as to provide a fully integrated production plan that is optimized across the various elements of a production operation. The production planning system 100 is driven by sales demand, both existing and forecasted. As such, the production planning system 100 is responsive to sales demand entered into the system by sales department personnel, e.g., sales analysts.

Figure 1:
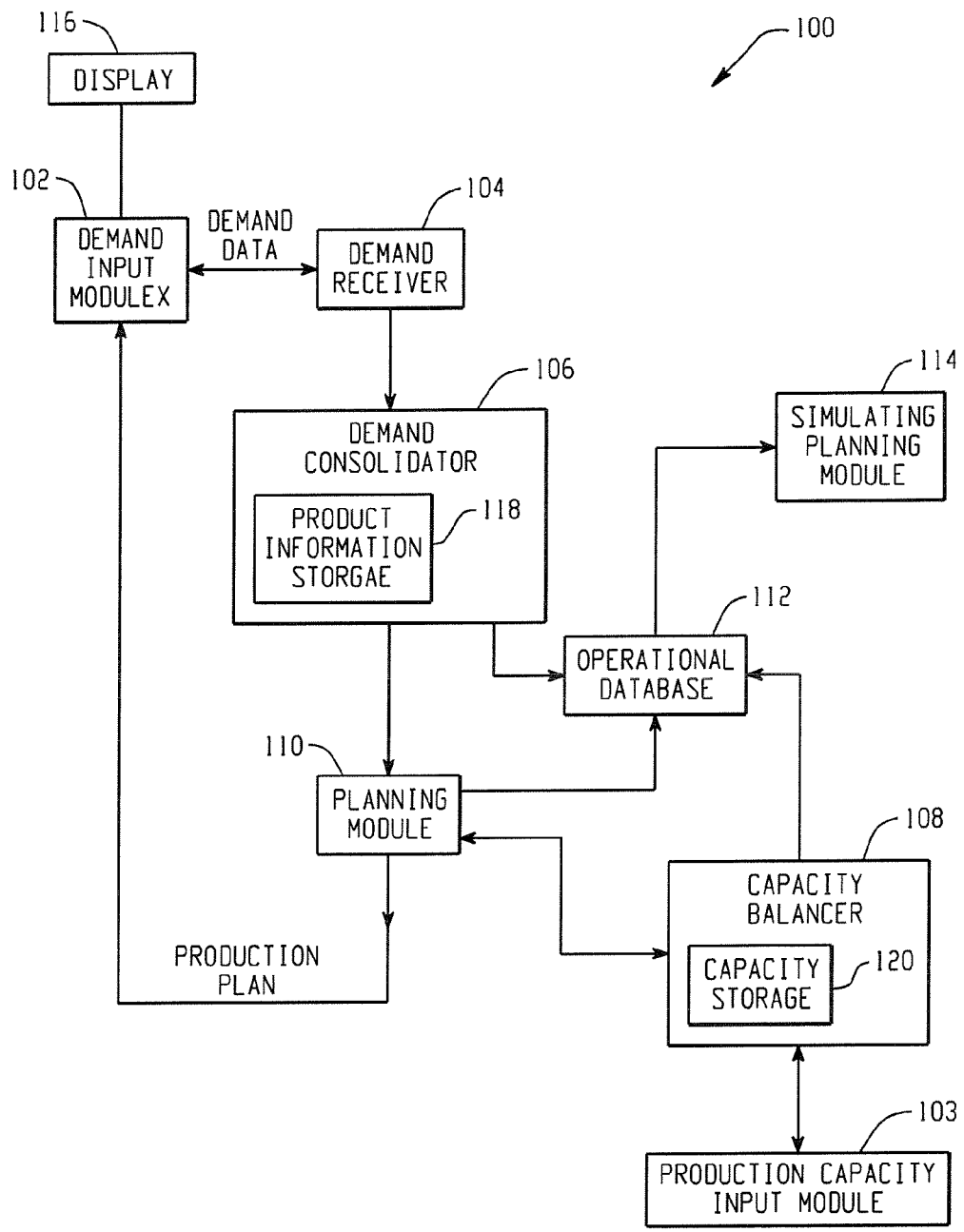
FIG. 1 schematically illustrates a production planning system according to the present disclosure.

As shown in FIG. 1, the production planning system 100 includes a demand input module 102, a production capacity input module 103, a demand receiver 104, a demand consolidator 106, a capacity balancer 108, an operational planning module 110 (hereinafter, "planning module 110"), an operational database 112, a simulating planning module simulating module 114 (hereinafter, "simulating module simulating module 114"), and a display 116. As described below, several of the components of the production planning system 100 are computer processing units or processors. However, as will be appreciated by a person of ordinary skill in the art, the system can include a single processor operating all of the above components or can be a series of interconnected processors performing any of the above-described operations (e.g., over a network). Moreover, the demand input module 102 and display 116 can be set up as a conventional computer terminal with a CPU unit, computer screen, and a keyboard and mouse, or can be provided in some other arrangement. For example, the demand input module 102 and display 116 can include wireless input devices.

The schematic illustration of FIG. 1 shows the communication channels or connections between the various components of the production planning system 100, as well as a direction of information flow within the production planning system 100. Particularly, the demand input module 102 is in communication with and sends information to the demand receiver 104, which in turn is in communication with and sends information to the demand input module 102 and the demand consolidator 106. Both the demand consolidator 106 and the capacity balancer 108 are separately in communication with and send information to the planning module 110. Additionally, the demand consolidator 106, the capacity balancer 108, and the planning module 110 are in communication with and send information to the operational database 112, which in turn is in communication with and sends information to the simulating module 114. Both the planning module 110 and the simulating module simulating module 114 are in communication with the demand input module 102, which is associated with the display 116. These connections, the flow of information, and the various components of the production planning system 100 will be described in further detail below.

With initial respect to the demand input module 102 and the demand receiver 104, FIG. 1 illustrates the connections and communication channels therebetween. As the name suggests, the demand input module 102 operates with the associated display 116 to allow the user to enter demand data, which may be data of an existing or forecasted sales demand. To allow such entry, the demand input module 102 and display 116 cooperate to provide an input device. The input demand data is then sent to the demand receiver 104, which operates as an information router that sends the received input demand data to the demand consolidator 106. Further, the demand receiver 104 communicates with the demand input module 102 so as to allow a user at the demand input module 102 to view a sales demand across the operation.

The input demand data can include various elements of the demand. Though the present disclosure will not discuss each and every demand feature that could be input, it is considered that the demand data may include product type data, product quantity data, and date requirement data. In the automotive production operation example, the product type data would be data referencing a particular vehicle model and trim. For example, the product type data may specify a Honda Accord, four-door, LX. With respect to the date requirement data, such data can include hard-dates for existing sales demands and soft-dates for forecasted sales demands.

Figure 2:
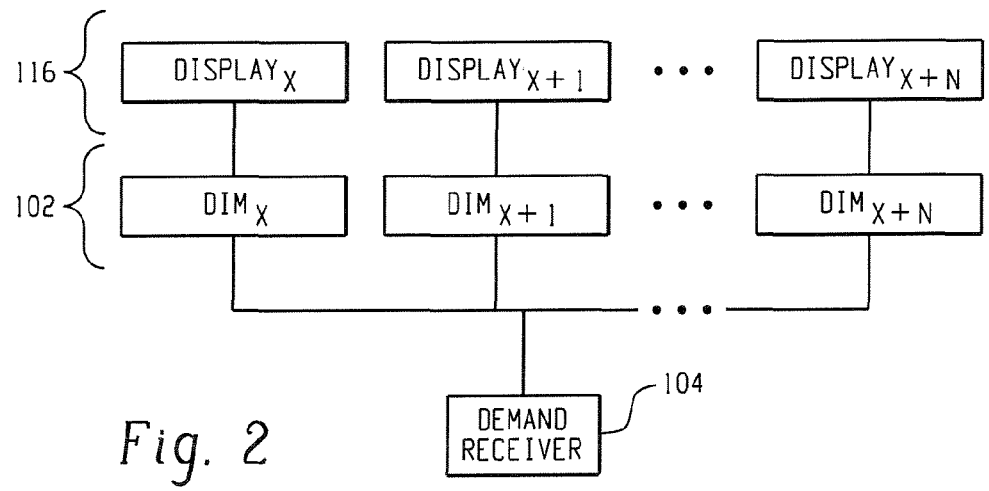
FIG. 2 schematically illustrates a relationship between demand input modules and a demand receiver of the production planning system.

In complex environments, demand may originate from various users and various sources. Accordingly, as shown in FIG. 2, the demand input module 102 may include a first demand input module X, a second demand input module X+1, and so on, until an $N^{th}$ demand input module X+N. Each of the demand input modules 102 are provided so as to be associated with a separate user or demand source. Returning to the automotive production operation example, the various demand sources can include a domestic demand, a demand for exports, a demand from foreign countries, such as a Canadian demand for a U.S.-based production planning system, and can also include service parts and cross-supply demands. By associating each demand input module 102 with a separate user or demand source, the sales demands originating from various sources can be entered at each demand input module 102.

Each demand input module 102 is in communication with other demand input modules 102 through the demand receiver 104, the demand consolidator 106, and/or the planning module 110. The cross-communication between each of the demand input modules 102 allows demand data from each of the various demand sources to be viewed at the display 116 associated with each of the demand input modules 102. Accordingly, the user of any of the demand input modules 102 can view the input demand from any of the other demand input modules 102. As such, visibility of demand data across the entire system is provided, which facilitates sales planning associated with each separate demand source.

Input demand data at each of the demand input modules 102 is sent to and received by the demand receiver 104, which sends the input demand data to the demand consolidator 106 for consolidation. In this regard, the demand receiver 104 can be a separate component or processor, or can be incorporated or integrated within the demand consolidator 106. Further, the demand receiver 104 can be a single processor from which each of the demand input modules 102 communicate for input of demand data.

The demand consolidator 106 receives all of the input demand data from the demand receiver 104 and consolidates the input demand data to calculate or create a consolidated demand. The consolidation of input demand data at the demand consolidator 106 can simply take the form of summing or adding all of the input demand data to receive a total input demand. However, in certain environments, the demand consolidator 106 may need to perform other operations to establish a consolidated demand.

Specifically, the demand consolidator 106 may sum the quantity data for each product type to calculate a total product type requirement for each product type. The total product type requirement can also be temporally arranged so as to account for differing date requirements. Accordingly, the input demand data is consolidated into the consolidated demand, e.g., a total demand stemming from all demand sources, upstream from the planning module 110, where a production plan is created.

Figure 4:
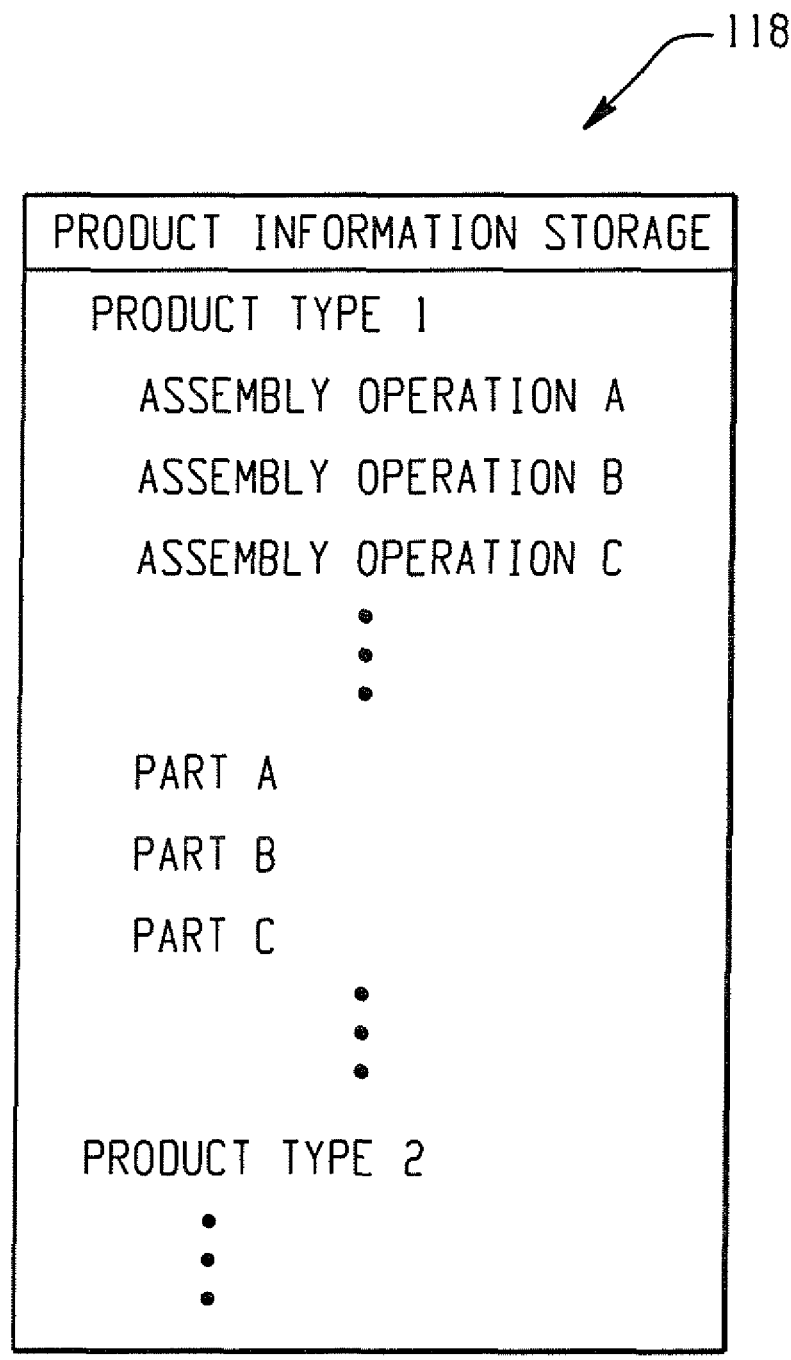
FIG. 4 is a representative diagram of a data hierarchy for a product storage information module of the production planning system.

The demand consolidator 106 also includes a product information storage module 118 that stores information related to each of the product types. As exemplified by FIG. 4, the product information storage module 118 operates as a database storing production information for each of the product types. The production information may at least include assembly operation requirement and part requirement data for each product type. The assembly operation requirement data relates to assembly operations required to produce a particular product type; and the part requirement data refers to the parts required, e.g. a bill of materials, to build a particular product type.

Both the assembly operation and part requirement data may be provided in tiered levels down to the most basic assembly operations and part requirements. Higher tiered levels may be directed to specific production facilities or production lines or complex assembly operations within specific production facilities, as well as assembled components. At lower tiers, the specific assembly operations within the production lines and the subcomponents for the pre-assembled components are listed. Accordingly, the product information storage module 118 maintains information on each product type in tiered levels down to the most basic parts and assembly operations.

In addition to including assembly operation requirement information and part requirement information, the product information storage module 118 also includes nomenclature information related to each of the assembly operations, parts and even product types. In this regard, it is noted that the nomenclature assigned to particular product types, assembly operations or parts at the sales end may differ from that assigned or used at the production end. As such, the product information storage module 118 allows for a translation of differing nomenclatures between the sales and production staff with such being displayed to the sales and production staff through the display 116 as will be described in further below.

The demand consolidator 106 utilizes the information in the product information storage module 118 to expand the consolidated demand into an expanded consolidated demand. The expanded consolidated demand is an expansion of the consolidated demand made by incorporating the assembly operation requirement data and the part requirement data. As such, the consolidated demand comprises a summation of all assembly operation requirements and part requirements for meeting the consolidated demand.

For example, an input demand from one demand module includes 30,000 units of Product Type 1 and an input demand from another demand input module 102 includes 70,000 units of Product Type 1, then the consolidated demand for Product Type 1 is 100,000 units. The demand consolidator 106 then expands the 100,000 unit consolidated demand of Product Type 1 to comprise 100,000 of the assembly operations required to produce a single unit of Product Type 1, and 100,000 of the parts required to produce a single unit of Product Type 1. The demand consolidator 106 will perform this expansion for all product types (Product Type 2, 3, etc.). The sum expanded consolidated demand will then include a listing of assembly operations and parts required to meet the consolidated demand, e.g., to produce all of the required units of each of the demanded product types.

The expanded consolidated demand is sent through a communication channel to the planning module 110. Further, the consolidated demand and the expanded consolidated demand are sent to the demand receiver 104 and each demand module 102, such the consolidated demand and the expanded consolidated demand can be displayed to the user on the display 116 associated with the demand input module 102 being used by the user. As such, in addition to being able to view input demand data from other demand input modules 102, the user can view the consolidated demand and the expanded consolidated demand at the display 116 of any of the demand input modules 102. The expanded consolidated demand can be viewed at any tier selected by the user, such as a demand per product type, per specific feature, per assembly operations and/or parts required, etc.

In addition to the expanded consolidated demand being sent to the planning module 110, capacity information is also sent to the planning module 110 from the capacity balancer 108. The capacity balancer 108 is a unit that calculates and stores production capacity information in a capacity storage module 120, the production capacity information being information related to a total production capacity, an allocated production capacity, and an available production capacity. As used herein, production capacity references assembly operations, parts, and any other features associated with production capabilities.

Figure 5:
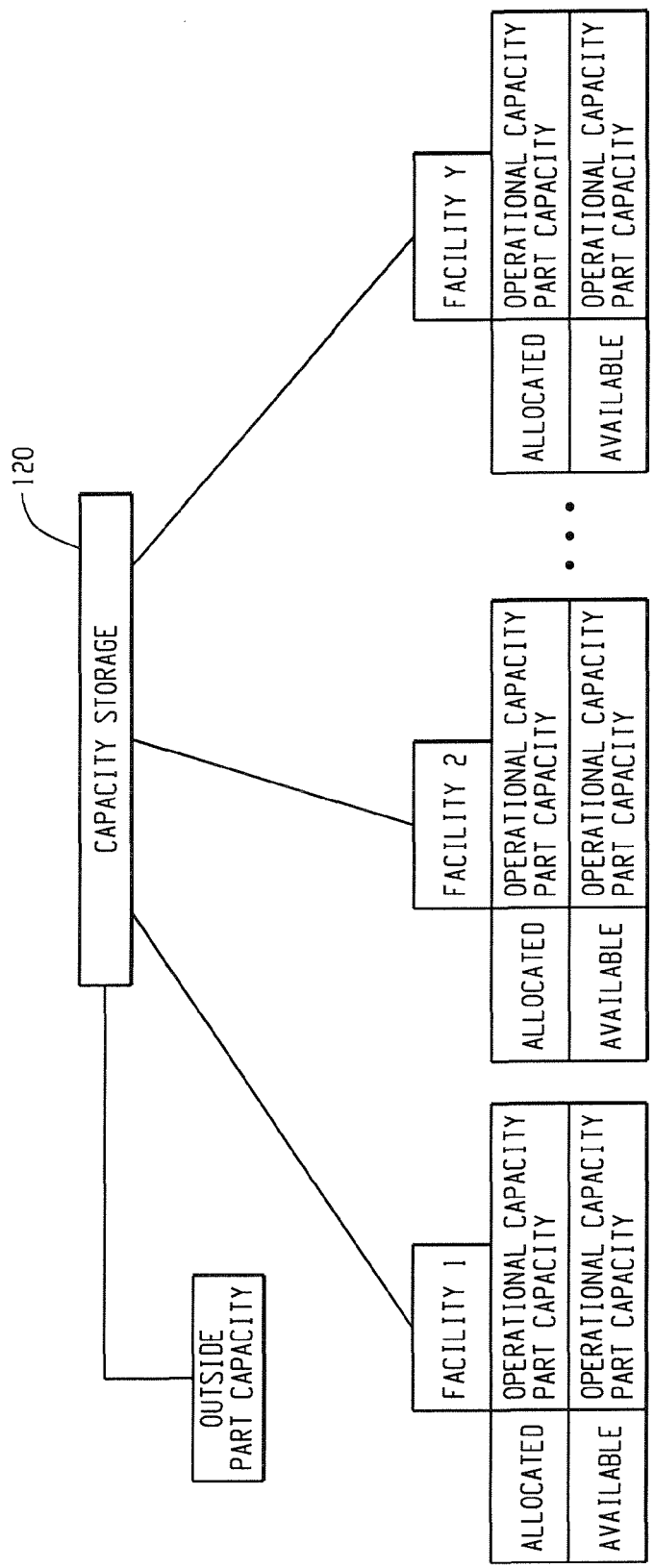
FIG. 5 is a representative diagram illustrating a data hierarchy for a capacity storage module for the production planning system.

It will be appreciated that production capacity has various sources. For example, assembly operation and part capacity can be present at various production facilities. Further, part capacity, as well as certain assembly operation capacity, can be present through outside suppliers. Similarly, transport and storage capacity can be related to the various production facilities, as well as to outside suppliers, and other areas. An exemplary informational hierarchy for the capacity storage module 120 is shown in FIG. 5. As shown, production capacity is available from a plurality of production facilities, Facility 1, Facility 2, . . . , and Facility Y, as well as from outside sources, particular from outside parts suppliers (denoted "Outside Part Capacity" in FIG. 5).

With respect to the production capacity at the various production facilities, the capacity storage module 120 stores an allocated production capacity and an available production capacity associated with each facility. The allocated production capacity is production capacity that is allocated in an operating production plan, the creation of which will be described below, to meet the consolidated demand. The available production capacity is an unallocated portion of the production capacity, and as such is production capacity that can be used to meet new or additional demands. Further, within each of the allocated and available production capacities, information regarding assembly operation production capacity (operational production capacity) and part capacity is stored. The operational production capacity is related to assembly operations capacity, such as the assembly operation capacity available in each of the production facilities, and the part capacity refers to the lowest level of production capability at an individual component.

With particular respect to the operational production capacity, said capacity comprises every assembly operation within the particular production facility, including each possible occurrence of any particular assembly operation within the production facility over the course of any time period, e.g., a planning period. In this regard, the assembly operation capacity includes a standard capacity and a maximum capacity. The standard capacity may be a production capacity wherein the production facility operates regular shifts without incurring overtime or utilizing extra shifts. The maximum production capacity may refer to a maximum usage of overtime and extra shifts, as well as other measures for increasing on the standard production capacity. For example, assuming the production facilities can maximally operate two, ten-hour shifts, seven days a week, the maximum production capacity may refer to a 140-hour work week. Assuming a standard capacity of two, eight-hour shifts, five days a week, a standard production capacity may refer to an 80-hour work week. Any usage greater than the standard production capacity is typically associated with an extra cost, which is at least associated with extra pay for overtime. Further, additional production capacity levels can be set, such as a standard-high production capacity, a maximum-low production capacity, a maximum-high production capacity, etc. Alternatively, production capacity levels can be set according to some criteria other than standard and maximum.

The standard and maximum production capacities are related to part and part group capacity. It will be appreciated that exceeding the standard production capacity in the realm of assembly operations will require additional parts, and as such the usage of assembly operation production capacity influences and affects the usage of part capacity. Further, the capacity storage module 120 stores information of standard and maximum part supply capacity from the outside suppliers. As such, part capacity can be balanced, and purchasing adjusted within the constraints of maximum part supply capacity from outside suppliers, according to production planning needs. It is noted that, as with assembly operation capacity usage greater than standard production capacity, utilizing part capacity greater than the standard part capacity can similarly result in an added cost incurred through the parts supplier.

With respect to the outside part capacity, the capacity balancer 108, and particularly the capacity storage module 120, maintains information with respect to the production and packaging capacities of all of the outside suppliers associated with supplying parts for the production of finished products. In maintaining this information, it is noted that the outside part capacity can refer to the most basic or lowest level parts, or can refer to higher level parts that are received pre-assembled. For example, certain pre-assembled components can be supplied from the outside suppliers. An example of a pre-assembled component that may be supplied to a vehicle production facility is a vehicle-mounted navigation system, or a vehicle wire harness.

In addition to storing information on production capacity, the capacity balancer 108 calculates values of total production capacity (at standard and maximum levels), available production capacity (at standard and maximum levels), and allocated production capacity. It can be readily appreciated that these values are interrelated. Particularly, the total production capacity may equal a sum of the available production capacity and the allocated production capacity. Further, as production capacity is allocated by the planning module 110 to meet the consolidated demand, the capacity balancer 108 recalculates and stores updated values of the total, available, and allocated production capacities.

The planning module 110 receives expanded consolidated demand data from the demand consolidator 106, as well as production capacity information from the capacity balancer 108. Using these values, the planning module creates a production plan, wherein production capacity is allocated to meet the demand. As will be described in further detail below, the production plan created by the planning module 110 is balanced and can include both a short range sub-plan and a long range sub-plan.

The short range sub-plan is a production plan set for a short term period of time, so as to meet an immediately required demand. As an example, the short term period of time can be one month. The long range sub-plan is a production plan set for a longer term period of time, so as to meet downstream demand requirements, as well as forecasted demand requirements. As an example, the longer term period of time can extend to eighteen (18) months. As the long range sub-plan is set to meet downstream and forecasted demands, as opposed to immediately required demands, more flexibility in production planning is allowed with the long range sub-plan as compared to the short range sub-plan.

In creating a production plan, the planning module 110 may create an initial production plan that ensures that all demands, immediate, downstream, and forecasted, are met. The production plan creation may include allocating production capacity to meet the consolidated demand so as to ensure that the consolidated demand is met. Once the initial production plan is created, production plan balancing is undertaken by the planning module 110 so as to smooth and optimize the production capacity allocation, e.g., the production plan.

Figure 6:
FIG. 6 is a graph showing an exemplary production capacity usage over time.

With reference to FIG. 6, a graph showing production capacity usage by percentage over time for an exemplary initial production plan is provided. The dashed line at the top of the graph, extending horizontally from 100% capacity usage, is a line indicating a maximum production capacity. The lower dotted line, extending from 80% production capacity usage, represents a standard production capacity. The solid line represents planned production capacity usage over time for the initial production plan.

The exemplary initial production plan is shown as utilizing production capacity at a level below the standard production capacity usage, save for a brief time period, which is circled. During this period, production capacity usage rises above the standard production capacity usage. Accordingly, this period of higher than standard production capacity usage may be associated with a higher cost, e.g., may require overtime on the part of the production facilities and/or extra, potentially higher cost, parts being supplied from the parts suppliers.

If the higher than standard production capacity usage falls within the short range production sub-plan, the excess production capacity usage may be required in order to meet the immediate demand. However, if the period of production capacity usage above the standard production capacity usage falls within the long range sub-plan, the planning module 110 can utilize a balancing operation to smooth or optimize the production plan and production capacity usage to eliminate or reduce the usage of production capacity above the standard production capacity. Specifically, the production capacity usage for the time period preceding and/or following the excess production capacity usage can be increased, to a level short of exceeding the standard production capacity, so as to reduce or eliminate the need for production capacity usage above standard production capacity.

As standard capacity usage is generally at a lower cost than production capacity usage above a standard level, this may result in a cost savings in the production system. It is also noted that the production capacity usage references part capacity usage and packaging usage. Thus, the balancing operation balances the entirety of production capacity allocation. Particularly, the balancing process compares the stated capacities at multiple tiers (vehicle to part level) against stated demands, both short and long range, and displays the results. At each level, the stated results reflect: over-capacity, close-to-over-capacity, balanced capacity, and open capacity resulting in business actions by involved groups.

The approved and balanced production plan is then sent from the planning module 110 to the production control system and then on to the various production facilities, the sales department, the purchasing and logistics departments, and any other areas that may need to use the production plan. Within the production planning system 100, the production plan is sent to the demand input modules, the capacity balancer 108, and the operational database 112. The operational database 112 stores the production plan, and the capacity balancer 108 uses the newly created production plan, reflecting any updates, to update the production capacity information.

Specifically, the allocated and available production capacity information will likely need to be updated as a function of a new production plan being created. It is noted that the planning module 110 may not simply allocate available production capacity to meet a newly input demand. Rather, depending on the requirement date of the demand and other optimizing factors, the planning module allows reallocation of already allocated production capacity in order to meet the new consolidated demand.

To send the newly created and balanced production plan to each demand input modules 102, the planning module 110 may be directly connected to each of the demand input modules 102, as illustrated in FIG. 1. Alternatively, the planning module 110 may utilize the communication pathway to the demand consolidator 106 and the demand receiver 104, or an additional communication pathway between the planning module 110 and the demand receiver 104 may be used. As the demand receiver 104 is already in communication with each demand input module 102, the demand receiver 104 can thereby be utilized to disseminate the production plan to the demand input modules 102.

Once received at the demand input module 102, the production plan can then be displayed on the display 116 associated with the demand input module 102. By displaying the production plan on the display 116, sales analysts and other sales staff can review the production plan, identify bottlenecks or opportunities within the production plan, and thereby adjust or improve upon their sales strategies. For example, the sales staff may be able to identify that a particular product type may be able to be produced in larger number without exceeding the standard production capacity usage. In view of this, a sales strategy can be put in place to encourage the sales of that particular product type. Such sales strategies can include incentives and/or rebates for the particular type in automotive operation.

Figure 3:
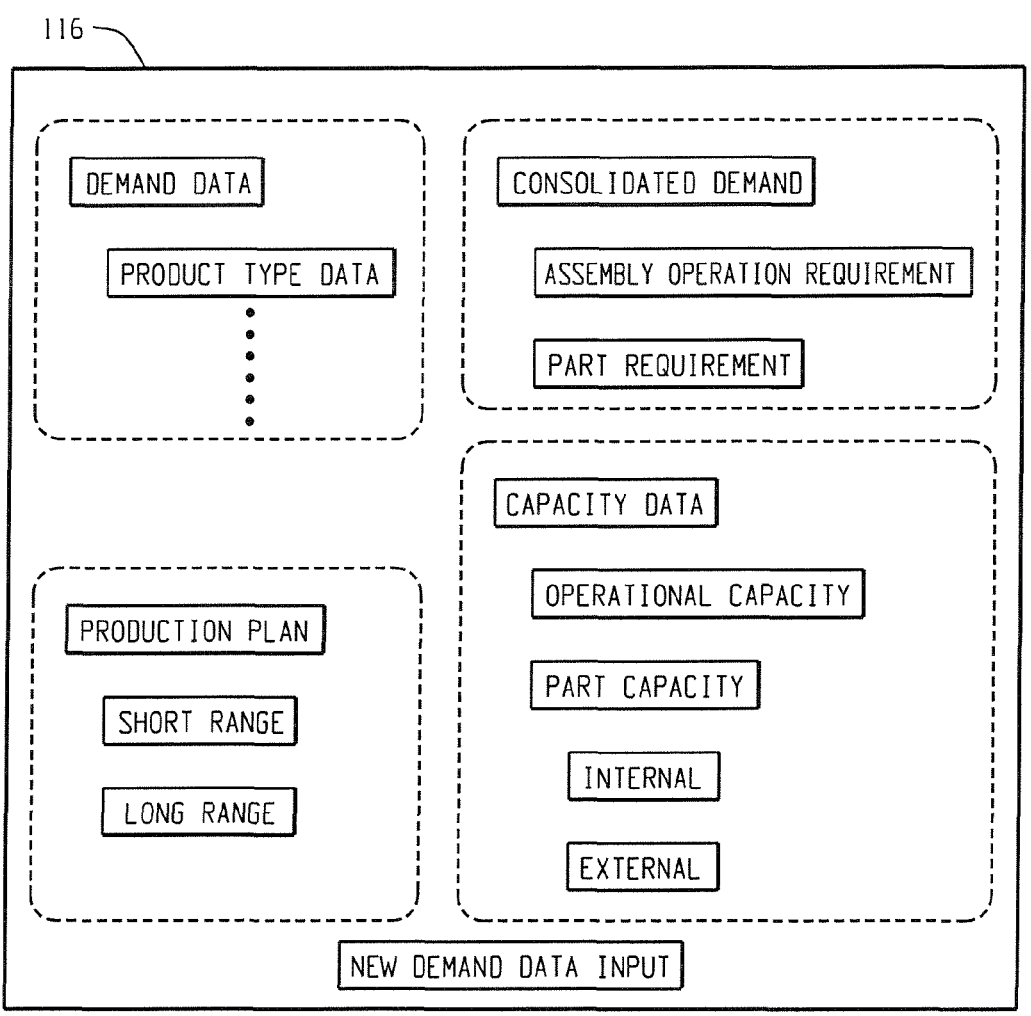
FIG. 3 is a representative illustration of a display associated with the demand input modules of the production planning system.

So as to provide a complete view of the production plan, the production capacity information, and any demand data, the display 116 allows a sales analyst at any of the demand input modules 102 to take a holistic view of the production planning system 100. As exemplarily illustrated in FIG. 3, the display 116 allows sales analysts or other sales staff to view constrained demand data, consolidated demand capacity data, a production plan, and also allows for the input of new demand data. With respect to the displayed demand data, the displayed demand data may include only the product types and quantities required, or can be selectively expanded to include the particular product information from the product information storage module 118. It is noted that the demand data displayed on any of the displays 116 is demand data input at any of the demand input modules 102. As such, sales staff using any of the demand input modules 102 can view the demand input from any of the other demand input modules 102, and thereby adjust their planning accordingly.

Additionally, the display 116 allows the user to view the consolidated demand, showing product type and quantity, as well as date requirement data, or as the expanded consolidated demand, wherein a list of assembly operations required and parts required is shown. Similarly, capacity data is displayed on the display 116 and can include high level capacity data or can be broken down into particular operational capacity and part capacity, both internal and external, and with respect to standard and maximum production capacity.

The production plan can be displayed on the display 116 so as to include both the short range sub-plan and the long range sub-plan. Moreover, the display 116 can provide statistical information regarding the existing production plan, such as duration or portion of time during which production capacity usage is at or below the standard level, and the portion of time during which the production capacity usage is above the standard level. Additionally, the production plan can be displayed as a high-level production plan, which shows general production capacity allocation to meet the demand over time, or can be expanded to show lower-level production capacity allocation, including production line usage, part usage, or specific assembly operation usage. To facilitate the review of the displayed production plan, the production plan can be displayed as a listing of production capacity allocation, or can provide a visual or graphical depiction of the production capacity allocation.

By providing all of the sales analysts with the ability to view this information at the displays 116 associated with any of the demand input modules 102, the sales analyst can use the holistic view of the production system to identify opportunities and recognize bottlenecks. It is noted that each of the demand input modules 102 and displays 116 provide the opportunity for a sales analyst to input new demand data. Upon the input of new demand data, the production plan will be revised or updated so as to reflect the new consolidated demand calculated by the demand consolidator 106. As will be explained in further detail below, the input of new demand data causes a real-time updating of the production plan, consolidated and expanded consolidated demand, and production capacity.

In analyzing the production plan and determining a best course of action to take advantage of any potential opportunities or to remedy or alleviate problems associated with bottlenecks in the system, the production planning system 100 provides simulating module 114. The simulating module 114 allows sales analysts to simulate the effect of introduction of new demands on the production system. Particularly, the production planning system 100 provides the simulating module 114 so as to allow for analysis of the introduction of new demands without affecting an operational production plan. Such simulating operation will be referred to as a simulated or simulating mode, or a sandbox mode.

Figure 7:
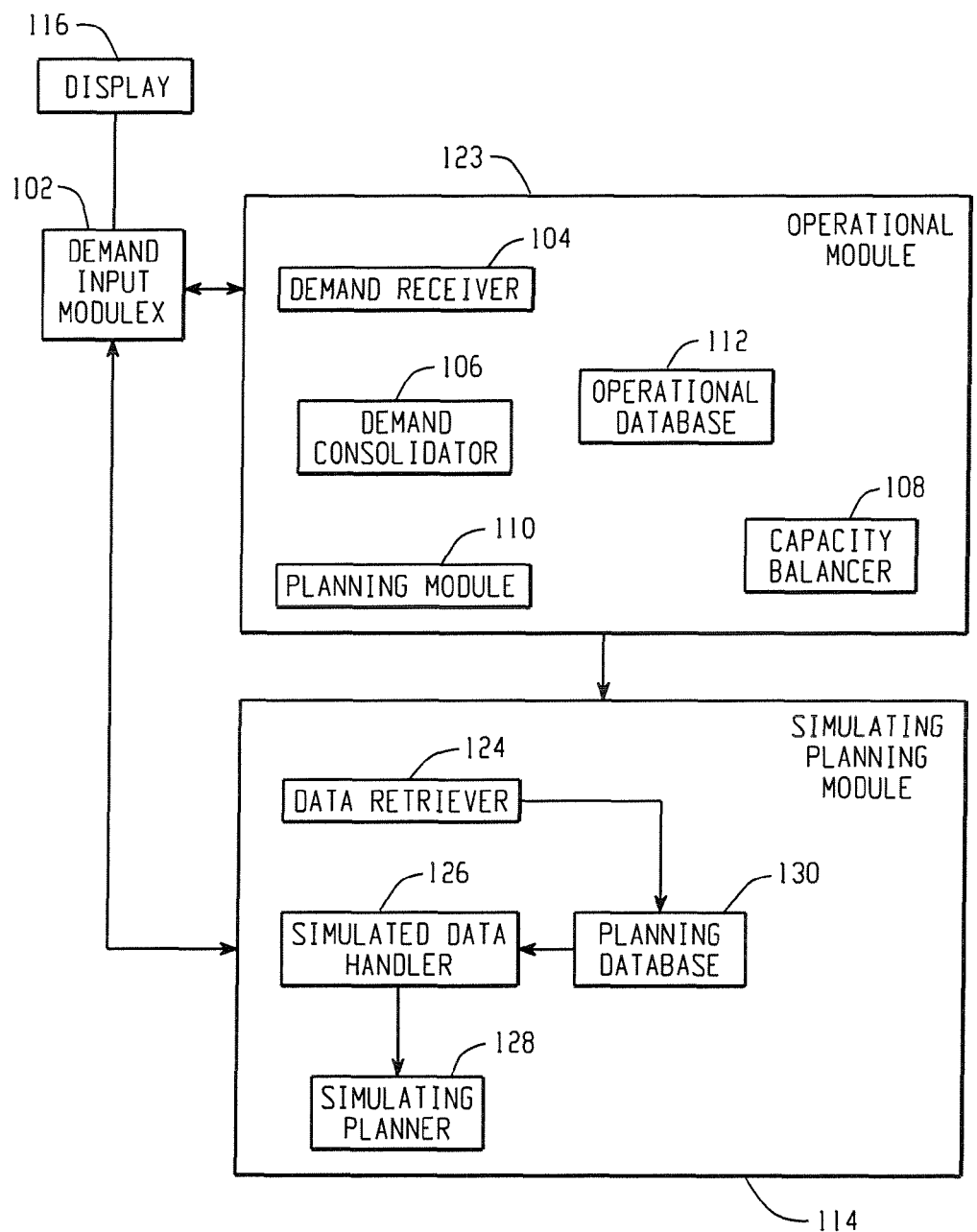
FIG. 7 schematically illustrates a production planning system incorporating an operational module and a planning module.

FIG. 7 schematically illustrates the production planning system 100 with the simulating module 114, along with the operational module 123. The operational module 123 includes most of the production planning system 100 components described with respect to FIG. 1. Particularly, the operational module 123 includes the demand receiver 104, the demand consolidator 106, the capacity balancer 108, and the planning module 110. In sum, the operational module 123 maintains input demand data, consolidated demand, expanded consolidated demand data, production capacity data, and short range and long range production sub-plans. This information can be stored in the operational database 112 within the operational module 123.

The simulating module 114, though described using different terminology, is substantially a mirror image of the operational module 123. The simulating module 114 includes a data retriever 124, a simulated data handler 126, a simulating planner 128, and a simulating database 130. The data retriever 124 is in communication with the operational database 112, and operates to retrieve all information from the operational database 112 for use within the simulating module 114. In this way, through use of the simulating module 114, sales analysts can simulate the effect of new or different demand data on a simulated production plan without affecting the operational module 123. In this regard, once retrieved, the data retriever 124 sends the data from the operational database 112 to the simulating database 130, where the data is stored.

The simulating database 130 is in communication with the simulated data handler 126 and provides the data stored therein to the simulated data handler 126. The simulated data handler 126 is also in communication with each of the demand input modules 102 so as to allow for the input of simulated demand data when the production planning system 100 is being used in the simulating mode. The newly input simulated demand data is then inserted or incorporated into the formation of a simulated production plan, allowing sales analysts the ability to view the effect of inputting the simulated demand data.

The simulated data handler 126 operates in much the same way as the demand consolidator 106 of the operational module 123. That is, the simulated data handler 126 creates a consolidated simulated demand, wherein the simulated demand input from the demand input module 102 is consolidated with the consolidated demand from the operational module 123 and simulating database 130 to create a simulated consolidated demand. The simulated consolidated demand is sent from the simulated data handler 126 to the simulating planner 128.

The simulating planner 128 operates in much the same way as the planning module 110, and creates a simulated production plan incorporating the simulated input demand data. The simulated production plan can include a simulated short range production sub-plan and a simulated long range production sub-plan. All simulated production plan information is sent from the simulating planner 128 to the demand input module 102 and displayed through the display 116. Accordingly, sales analysts utilizing the simulating module 114 can see a simulated production plan associated with the entry or input of simulated demand data.

By analyzing the simulated production plan, the sales analysts are capable of determining the effects of altering sales and marketing strategies to increase any particular sales demand on the production system. By allowing the sales analysts the ability to review the potential effects of the input of a new sales demand, the sales analysts can plan accordingly. Further, if the simulated production plan is seen as preferably to the operational production plan, the production planning system 100 can incorporate the simulated demand into the operational consolidated demand, and transform the simulated production plan to the operational production plan. As such, the simulated consolidated demand is set as the consolidated demand, and the simulated production plan is set as the operational production plan.

Figure 8:
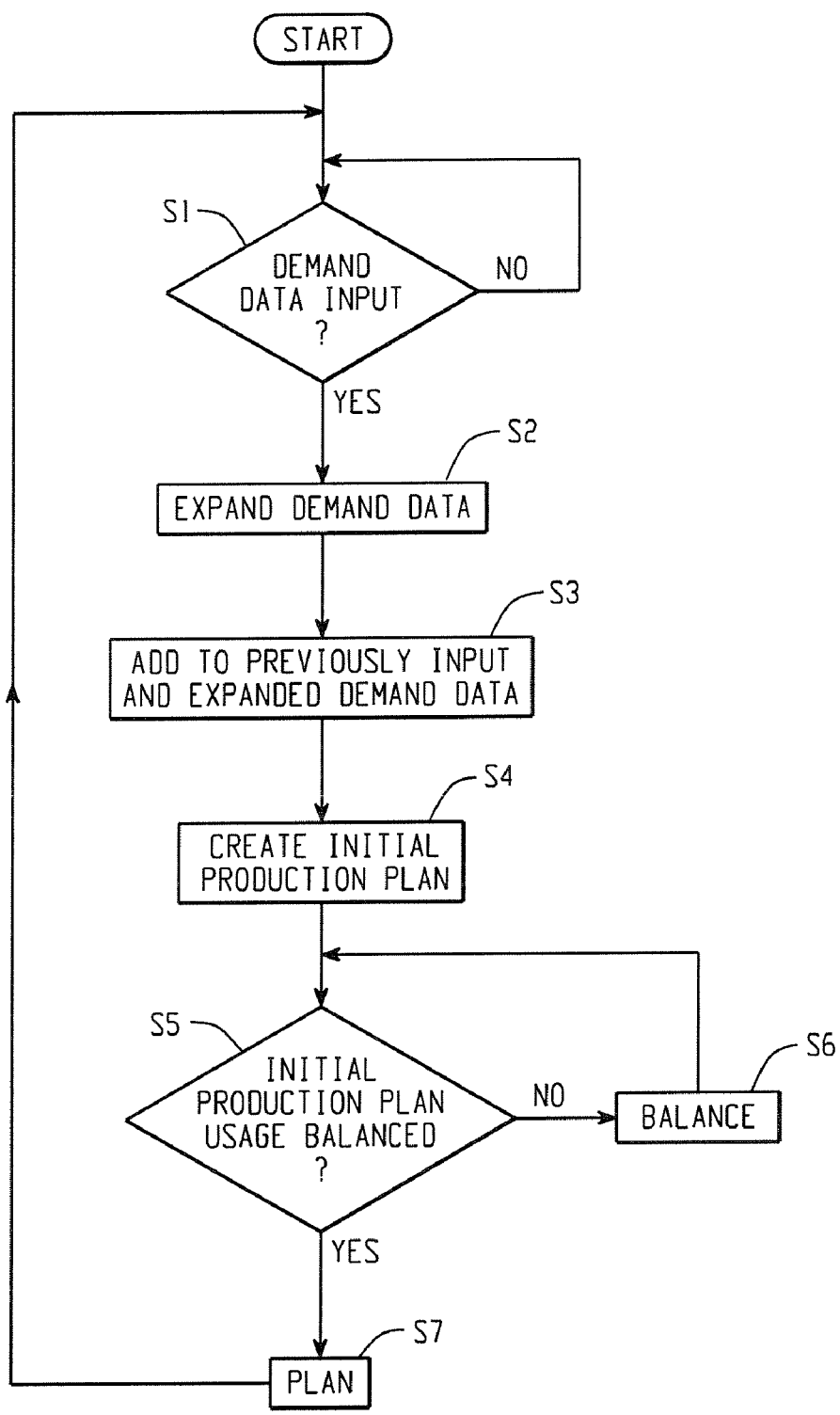
FIG. 8 is a flowchart illustrating a method for production planning according to the production planning system.

With reference to FIG. 8, a method for planning production is illustrated. The method will be described with particular reference to the production planning system 100, though it is to be appreciated that the method could be used with other systems. In S1, the production planning system 100 determines whether new demand data has been input to any of the demand input modules 102. If not, the system continues to wait for new demand data to be input into any one of the demand input modules 102 and maintains an existing production plan. If new demand data is input into any of the demand input modules 102, the demand data is received by the demand receiver 104 and sent to the demand consolidator 106.

The input demand data at this stage includes product type data, quantity data, and date required data. The demand data is forwarded to the demand consolidator 106 where the demand data is expanded to include assembly operation required data and part required data (S2). The demand consolidator 106 then consolidates a previous consolidated demand and expanded consolidated demand with the newly input expanded demand data. Accordingly, an updated or new consolidated demand, both regular and expanded, is created (S3). It is noted that at the demand consolidator 106, the demand from all demand sources is consolidated upstream from any production planning. As such, the production plan is created with respect to a consolidated demand.

The updated consolidated demand and all production capacity data is then forwarded to the planning module where an initial production plan is created (S4). The initial production plan allocates production capacity to meet the simulated consolidated demand. However, the initial production plan is created to ensure that the simulated consolidated demand is met, but may not necessarily be balanced. Accordingly, following the creation of the initial production plan, a determination is made as to whether the initial production capacity usage allocation is balanced (S5).

If not, a balancing operation is carried out (S6). The balancing operation, as described with reference to FIG. 6 above, analyzes production capacity usage over the planning time period. Particularly, with respect to the long range production sub-plan, periods during which production capacity usage exceeds standard production capacity are identified, and a balancing of production capacity usage is made so as minimize or eliminate time periods during which allocated production capacity usage exceeds standard production capacity usage.

With respect to the production plan balancing operation, production capacity usage is preferably set to remain substantially constant over any duration of time, and more preferably set to remain constant at the standard production capacity level over any duration of time. Accordingly, when balancing, this goal is kept in mind, and the consolidated demand is set and production capacity is allocated so as to minimize any variance from the standard production capacity. It will be appreciated that inasmuch as production capacity usage may need to vary from the standard production capacity, it is preferable for the production capacity usage to be at the standard production capacity or just below the maximum production capacity as opposed to below the standard production capacity.

If the initial production plan is balanced or following the creation of a balanced production plan, a production plan is created (STEP 7). The created production plan includes both a short range production sub-plan and a long range production sub-plan, and is the production plan that is used. The production plan is then output to and implemented at the production facilities, and is displayable to the sales staff through any of the displays 116 associated with any of the demand input modules 102. Once a new demand data is input into any of the demand input modules 102, the operation shown in the flowchart of FIG. 8 repeats and a new production plan is created.

In updating the production plan, the short range production plan is preferably kept static so as to not require changes to short term production plans. Preferably, any new demand data input into the system will affect only the long range production sub-plan. In view of this, any demand data newly input into the production system 100 will preferably be for a demand with a long range date requirement, and as such will only affect the long range sub-plan.

The above-described production planning system 100 provides for improved production planning and optimization of both sales analysis and production planning. Particularly, it is noted that sales and production are fully integrated to allow for improved production planning and sales analysis. As such, production capacity can be adjusted to meet a sales demand.

Specifically, a sales analyst using any of the demand input modules 102 can see all production-related constraints, as well as all demand requirements, when entering new demand input data. The production-related constraints include at least assembly operation requirements, assembly operation capacity, part requirements and part capacity. As used herein, assembly operations can refer to cycle times for production of a particular product type, and required machine time for same, as well as any quality inspection procedures or statistical analysis of refinishing or corrective work.

It is further noted that by consolidating and expanding the demand prior to production planning, the demand consolidation is done upstream from production planning. Accordingly, sales analysts are provided with a more complete view of the overall sales demand on the production system. Furthermore, the ability to view demand data input at other demand input modules 102 associated with other demand sources allows sales analysts to view and understand the various demands originating from the various demand sources and plan accordingly.

By consolidating the demand sources, sales analysts can view the entire system, including integrated demand data. This enhances sales analyst ability to view and identify any issues with demand from the various demand sources, and allows for improved troubleshooting of any identified issues. The troubleshooting or optimization can then take place in each relevant environment or with respect to each demand source, and is undertaken in view of other, frequently related, demand sources, as well as in view of any production-related constraints.

FIGS. 9-12 provide exemplary display outputs associated with the production planning system. The exemplary display outputs are only partially filled to illustrate a display output associated with the production planning system. It is noted that an operational system may include more specific data related to the production planning system, and will include more values. Additionally, the exemplary displays of FIGS. 9-12 are only generally described herein so as to simplify the explanation of the displayed output. It will be appreciated that the exemplary displays illustrate features related to aspects of the production planning system beyond those described below.

Figure 9:
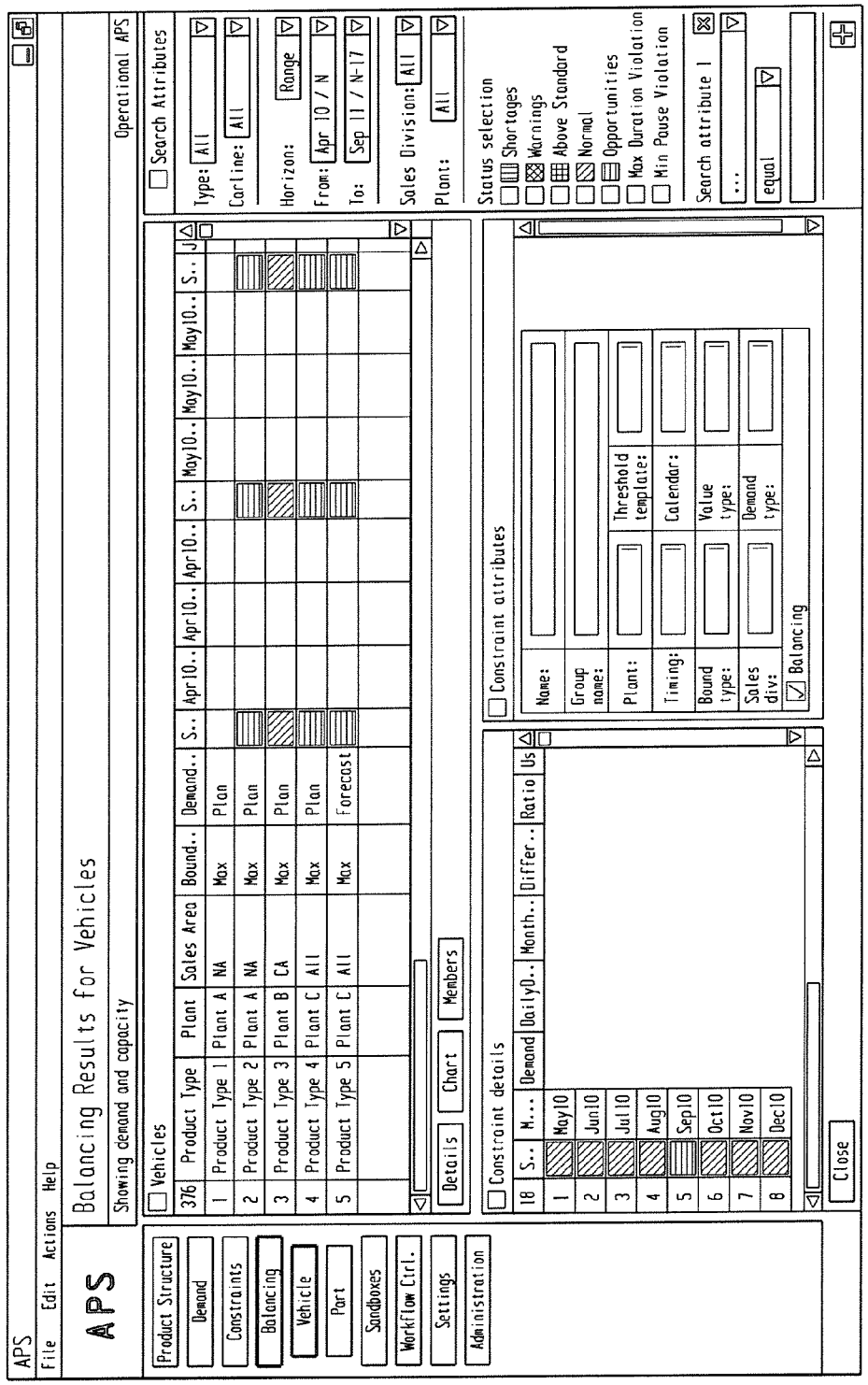
FIG. 9 is an exemplary display output illustrating balancing results for vehicles.
Figure 10:
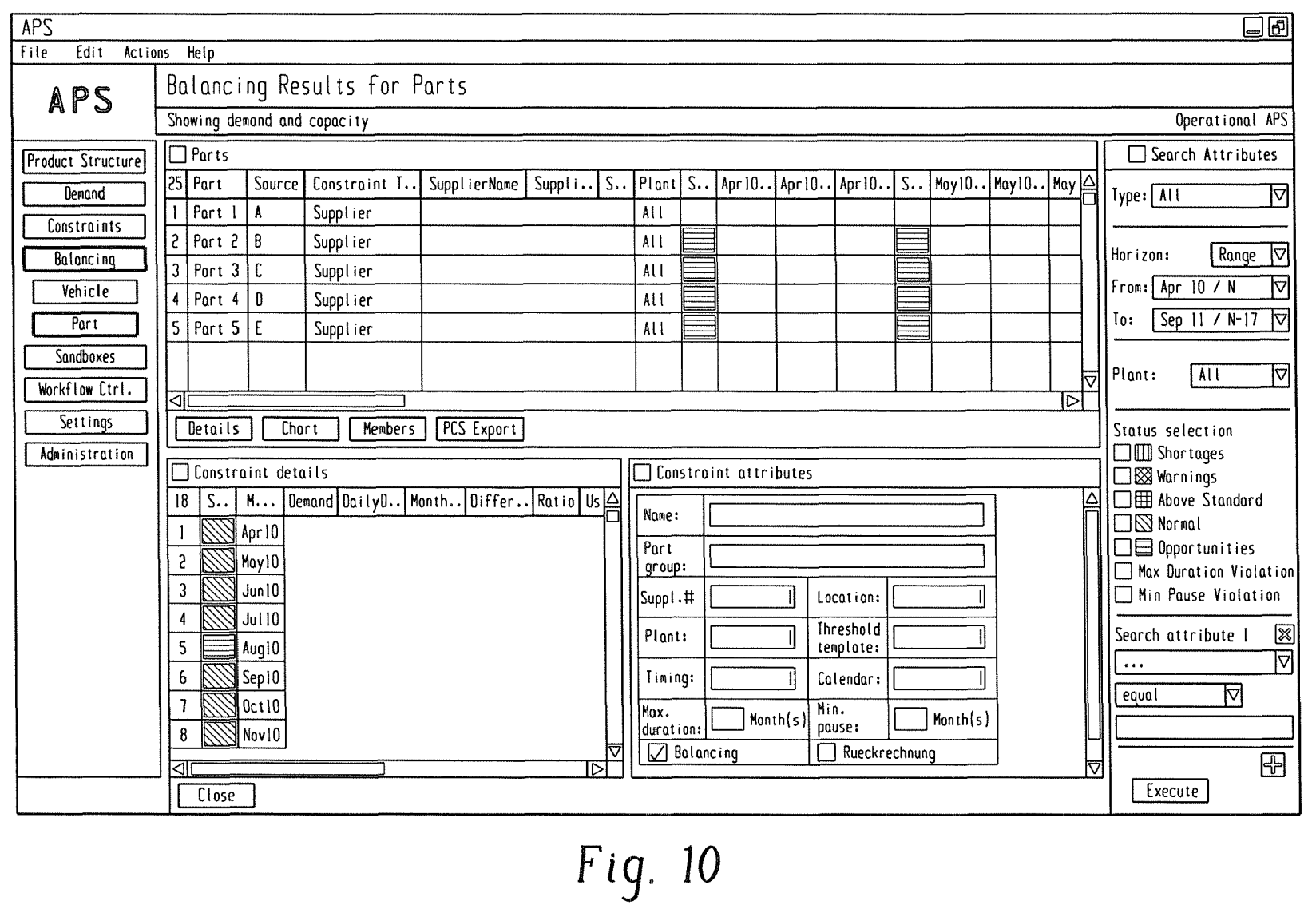

Beginning with FIG. 9, exemplary "Balancing Results for Vehicles" are displayed. The display includes a listing of Product Types (1-5), e.g., vehicles, production facilities ("Plants") where the Product Types are produced (A-C), a Sales Area for each of the Product Types (NA, CA, All), the type of Demand (Plan or Forecast) for each of the Product Types, and an identification of a constraint related to each of the Product Types (Shortages/Warnings/Above Standard/Normal/Opportunities/Max Duration Violation/Min Pause Violation). FIG. 10 illustrates "Balancing Results for Parts", and includes a listing of Parts (1-5), a Source for each of the parts (A-E), a listing of Constraints and Plants using the Parts, and an identification of Constraints related to the Parts.

It is noted that the listing of Product Types shown in FIG. 9 may be the consolidated demand, and the listing of Parts shown in FIG. 10 may be the associated expanded consolidated demand. FIGS. 9 and 10 further show the allocation of production capacity (at the production facility or "Plant" level) to meet the consolidated and expanded consolidated demand, respectively. It is noted that the display is operable to show production capacity allocation at higher and lower levels than the "Plant" level. It is further noted that, in contrast to the illustrated listing, different Plants can be operable to make the same product.

Figure 11:
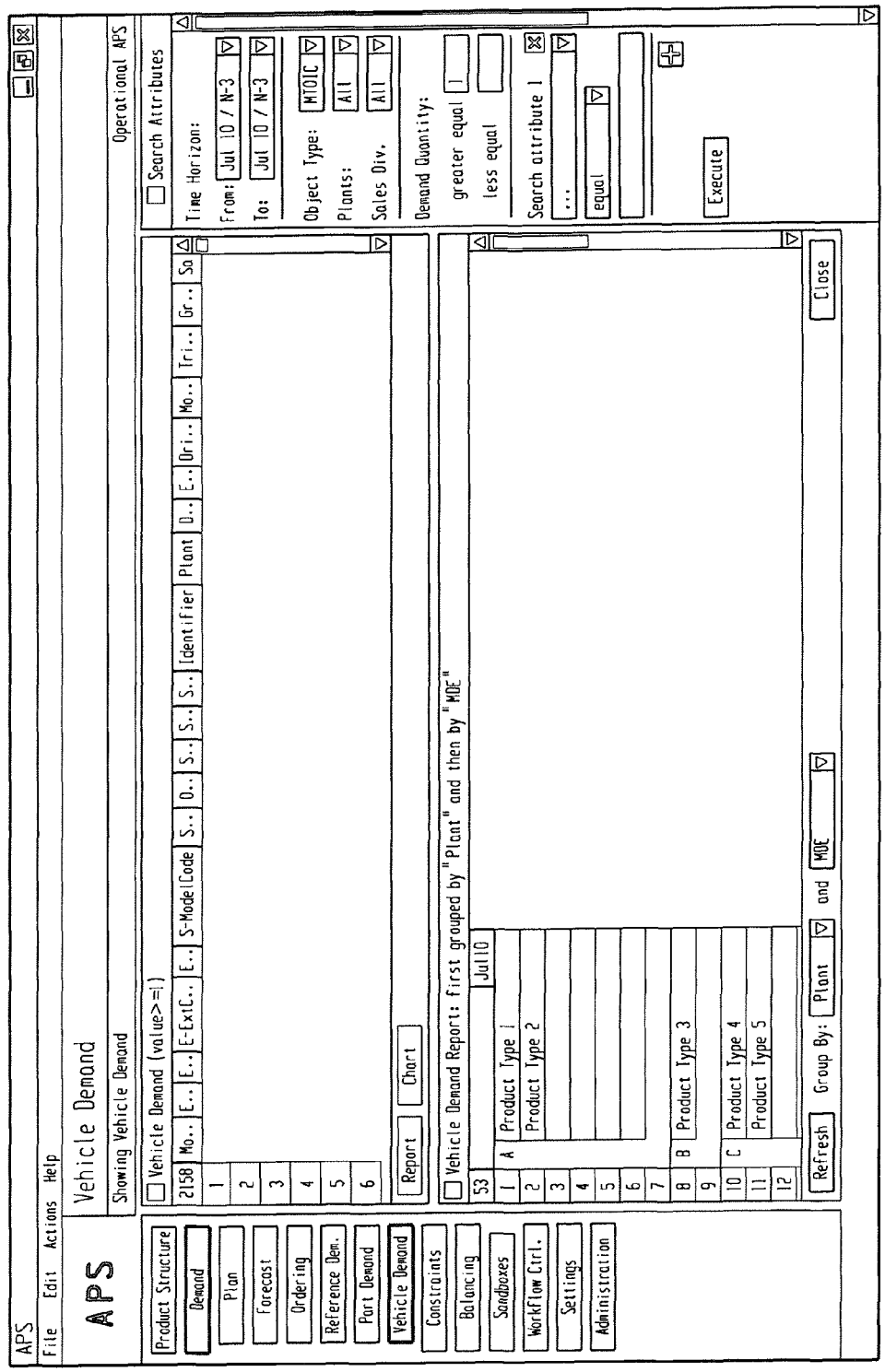
FIG. 11 is an exemplary display output illustrating vehicle demand.
Figure 12:
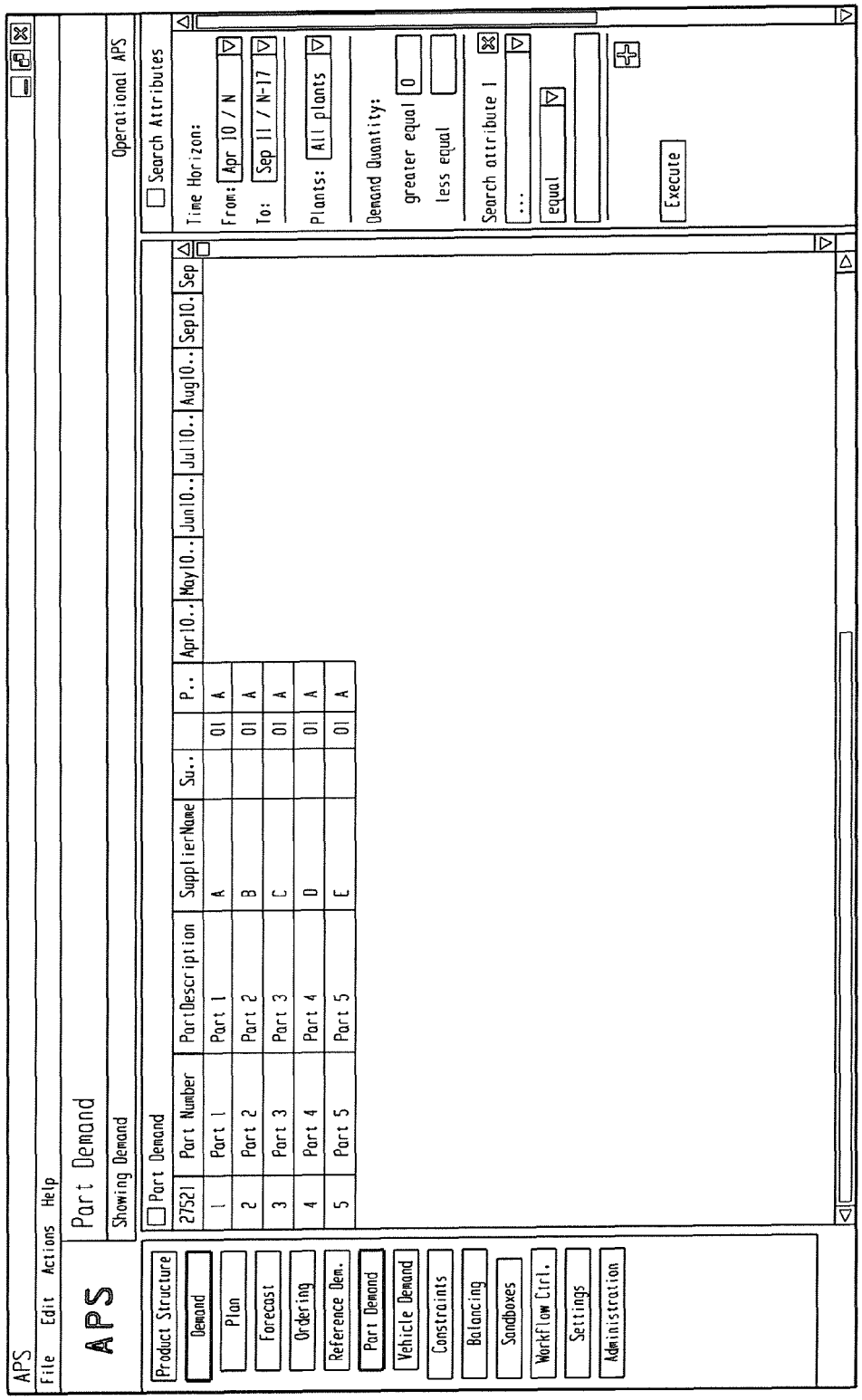
FIG. 12 is an exemplary display output illustrating part demand.

FIGS. 11 and 12 illustrate displays showing details related to the Vehicle Demand and Part Demand, respectively. Particularly, FIG. 11 shows the various Production Facilities or Plants (A-C) at which each of the Product Types (1-5) are to be produced or can be produced. FIG. 12 shows information on the various Parts, including Part Numbers, Part Descriptions, and Suppliers that provide the parts. These output displays allow a user to view product and part demands across the system. Though not illustrated, the demands can also be listed with reference to the source or point of origin.

Further, by creating and using a production plan having a short range production sub-plan and a long range production sub-plan, the production planning system 100 can create an integrated production plan that satisfies demands that need to be met relatively immediately, and long range demands, such as forecasted sales demands. With respect to the time periods associated with the short range production sub-plan and the long range production sub-plan, as an example, the short range production sub-plan can encompass a period of one month and the long range sub-plan can extend for periods of several months or years, such as for an 18-month time period.

Moreover, the short range production sub-plan may frequently be associated with existing demands, e.g., demands that have been actually received and need to be satisfied by a set date requirement. In contrast, the long range production sub-plan can be associated with existing demands with a downstream date requirement, as well as forecasted demands. Inasmuch as the long range production sub-plan incorporates both existing demand orders and forecasted demands, it is noted that the ability to update the long range production sub-plan through entry of newly input demand data may be helpful in updating sales forecasts that may prove to be incorrect as time passes. Moreover, the production planning system 100 may provide for an identification of forecasted demands and existing demands. In such an environment, forecasted demand can be transformed to an existing demand upon the placement of actual demand orders.

Another benefit of the above-described production planning system 100 is the ability to allocate production capacity from a highest level of product type and quantity requirements, to a lowest level of assembly operation or part requirements. Further, product type information is maintained broadly, and down to a bill of materials and required assembly operations. Such specialization allows for the optimization and maximization of efficiency in production planning by allowing for the consideration of any possible constraints, including those related to any particular assembly operation or part requirements. Accordingly, sales analysts can view potential problems and opportunities from various levels, thereby improving the likelihood of identification of a problem or opportunity.

With respect to the data levels, in the automotive production example, an input of demand data may relate to a Honda Accord, and particularly to 100,000 units of a Honda Accord. The demand data, as well as any associated capacity data, can be broken down to whether the Honda Accord order is for a Honda Accord sedan or coupe, whether it is for a 6-cylinder engine or a 4-cylinder engine, as well as for various trim levels and colors associated with the Honda Accord. Moreover, each of these relatively broader features of the exemplary Honda Accord demand data can be broken down to a bill of materials required to build each individual Honda Accord, as well as a listing of assembly operations required to build the Honda Accord.

The above-described production planning system 100 further provides an improved production plan through the recognition and usage of a standard production capacity and a maximum production capacity. Particularly, by recognizing a two-tiered capacity model, situations wherein an excess demand is present and need be met can be accounted for through the utilization of production capacity beyond the standard capacity and less than the maximum production capacity. Furthermore, the recognition that any production capacity usage above the standard production capacity could be associated with an added cost allows the system to maximize the production capacity usage over time so as to be at the standard production capacity.

With respect to the maximum production capacity, such production capacity can be associated with running longer shifts or with running extra shifts, frequently at an added cost. Additionally, maximum production capacity may be associated with ordering additional parts, or increasing operational machine time for certain production machines. The additional part orders may incur an added cost, and the additional operational machine time may result in an added cost through the time-cost associated with the machine, as well as increased maintenance requirements coupled with reduced maintenance time. Nevertheless, certain demand constraints may require the utilization of a production capacity greater than the standard production capacity.

With further respect to the capacity data stored in the capacity storage module 120 of the capacity balance 108, it is noted that information displayed based on the capacity data allows sales analysts to determine a capacity by product line. For example, the capacity data may indicate that a particular product line has sufficient capacity for added production. Such an identification can be utilized in sales and marketing strategies so as to increase the sales demand for the specific product line. In this regard, the production capacity data can both be expanded by the sales staff to see particular assembly operations and part requirements, or can be condensed from specific assembly operations and part requirements to include production capacity for particular product types or production lines.

As can be ascertained from the operational flowchart of FIG. 8, the production planning system 100 immediately updates a production plan upon the input of new demand data. As such, the production planning system 100 provides real time optimization that allows sales analysts to see both allocated and available production capacity on the standard and maximum production capacity levels. Moreover, the real time optimization of the production plan allows for a more efficient response to changes in demand data and production capacity.

With respect to the demand consolidator 106 and the capacity balancer 108 maintaining different names for similar parts or product types, the production planning system 100 operates as a translator between the sales and production personnel. It is noted that production parts or product types are frequently referred to by a first name by the sales personnel and by a different, second name by the production personnel. Furthermore, with respect to the production parts, the parts may have a third name assigned by the supplier. By maintaining all of the different names that any particular product type or production part may have, the production planning system allows for more ready communication between the outside suppliers, the sales staff, and the production staff, without the need for any of the above-named parties to have to translate the names of product types or production parts on their own. This translation function further serves the purchasing and logistics personnel in terms of reducing the effort required to translate product type or production part names.

An additional feature of the above-described production planning system 100 is a real time production capacity linkage with the production planning system. In this regard, any changes in production capacity, whether they be to the standard or maximum production capacity, can be identified, recognized and input into the system, and can be used to affect or adjust the production plan. This can be particularly useful when a new facility or production line is put on-line, or in response to a facility or production line being taken off-line. To allow for the updating of production capacity, production capacity input modules 103 can be provided at each of the production facilities, as well as to outside part suppliers.

The production capacity input modules 103 are similar to the demand input modules 102, but for their allowing of production capacity information input. The production capacity input modules 103, as shown in FIG. 1, are connected to the capacity balancer 108 so as to allow for the updating of production capacity. Alternatively, the demand input modules 102 and the production capacity input modules 103 can be consolidated into a single input module that allows for input of demand data and for the updating of production capacity.

By allowing for the updating of production capacity, sales staff can plan for long range contingencies, such as a strike or prolonged maintenance shutdown of any of the production facilities or production lines, or the short range production sub-plan can be updated in response to an immediate or unplanned shutdown of a production facility or a production line. It is noted that within production facilities, assembly equipment or machines can break down and thereby take a particular job, a production line, or an entire facility off-line. Further, production part capacity can be affected by damage to internal storage facilities, as well as due to legal, production-related, or transportation-related issues with outside part suppliers. The production planning system 100 allows for such contingencies, both planned and unplanned, and can adjust the production plan accordingly.

With respect to the real time optimization feature of the above-described production planning system 100, it is noted that a single management system is being utilized such that any new demand inputs or production capacity changes are immediately received by the production planning system 100 and are therefore visible across all potential users of the production planning system 100. Accordingly, as demand and capacity changes, the sales analysts, production staff, purchasing staff and logistics staff can respond and operate in conjunction with an updated production plan.

With respect to the simulating module 114 of the production planning system 100, sales staff can operate outside of the operational module 123 to simulate the effect on a production plan of certain marketing strategies or initiatives. Particularly, sales staff are provided with a mechanism that provides a feel for how certain incentives or other marketing campaigns may affect a sales demand. Similarly, the effect of certain non-sales demands, such as service parts required to meet a recall or service call, can be viewed with respect to the holistic system. Accordingly, the sales staff can use the simulating module 114 to see the effect of, or the possibility of, employment of increased or changing demands on the production plan.

By operating a simulating module 114 with a planning database 130 that is separate from an operational module 123 with an operational database 112, the sales analysts can engage in strategic planning without affecting the operational data in the operational database and the operational production plan. As such, the simulating module 114 allows for sales staff to engage in high level simulations to see the effects of changing demands on the production planning. Additionally, as mentioned above, the production plan and associated demand and capacity data displayed on the display 116 of each of the demand input modules 102 allows the sales staff to identify both problems and opportunities. Accordingly, the simulating module 114 allows the sales staff to adjust demand data in a simulated, non-operational, environment to see how the adjustment of the demand data would affect the production plan. Specifically, sales staff can seen how a change of demand data can improve potential problem situations centering around bottlenecks, and take better advantage of opportunities presented by the operational production plan.

With further respect to the creation of a short range production sub-plan and a long range production sub-plan, it is noted that the input demand data can be input with associated temporal requirement data, e.g., a date at which the input demand is required. Using the temporal requirement data, the planning module 110 can create the short range production sub-plan to satisfy demands having temporal requirement data within a predetermined time period, e.g. within a month, and a long range production sub-plan to satisfy demands having temporal requirement data that is outside of the time period, e.g. extending beyond one month.

With further respect to planning in view of a standard production capacity and a maximum production capacity, it is noted that a planning algorithm may employ statistical tools differing from planning to maintain production capacity allocation or usage at a level lower than the standard production capacity. As an example, a desired average production capacity usage can be set as a target, with a permissible variation value that ensures any deviation from the target production capacity usage does not exceed the maximum production capacity, though it is noted such a system will have to account for the necessity of production capacity usage greater than the standard production capacity when required.

It is also noted that the single production plan created by the production planning system 100 integrates processes and data between the various departments such that rules and policies are standardized. Accordingly, a high level and detailed planning processes between sales, manufacturing, purchasing and logistics are integrated. In addition to integrating production planning between sales, production, logistics, and purchasing, the production planning system 100 can integrate production planning between management and staff within any of the above groups, especially within the production facilities.

Specifically, because the production plan is produced with data regarding product type and quantity, with more specific information such as particular features of the product type (such as number of doors and trim) and expanded information regarding the product type being down to the assembly operations and bill of materials of the product type, the production plan integrates operations between production facility management and production facility staff. In this regard, production facility management can use the production plan to view high level production capacity allocation (product types and units required), while production facility staff can focus on the lower-level production capacity allocation (related to production lines and specific jobs and parts).

It will be appreciated that the above described planning system need not be configured in the exact manner described above. Particularly, the specific components can differ or be integrated or separated form each other, and the flow and handling of input demand data, consolidated demand data, expanded consolidated demand data, and production capacity data can operate and be transferred in a different manner. Furthermore, the description of such components is provided as an exemplary description to facilitate the understanding of information flow and therefore can be varied somewhat within the production planning system 100.

As such, certain components can be combined, or any particular component can be separated into a plurality of components. Moreover, the production planning system can be provided by a single processor or computer unit, or can be provided using a variety of processors, each of which communicate with a central server or a plurality of central servers. Additionally, as discussed above, additional input modules can be provided to the production facilities, the logistics and purchasing departments, and to the outside suppliers.

Additionally, each provided input module can be custom tailored to the particular source with which it serves. For example, assuming that the export demand source is only concerned with certain product types, such as certain vehicles that are exported, only information pertaining and relevant to the production planning of that particular product type can be displayed through the display 116 of that particular demand input module 102. Moreover, displays and input modules provided to the production facilities and purchasing and logistic departments may only show information relevant to the particular departments.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A production planning system for allocating production capacity to meet a demand, comprising:
   a demand receiver configured to receive input demand data, the demand data including temporal requirement data that sets a deadline by which the input demand data must be produced;
   a demand consolidator processing unit in communication with the demand receiver and configured to calculate a consolidated demand as a sum of all input demand data upon receipt of input demand data by the demand receiver;
   a capacity balancer processing unit for calculating and storing a production capacity; and
   a planning module processing unit configured to create a production plan by allocating production capacity to meet the consolidated demand based on the consolidated demand and the production capacity, the production plan having a short-range production sub-plan to satisfy demands having temporal requirement data within a predetermined time period, and a long-range production sub-plan to satisfy demands having temporal requirement data outside of a predetermined time period.

2. The system according to claim 1, further comprising a display configured to display the production plan,
   wherein the planning module processing unit creates the production plan upon receipt of a first input demand data at the demand receiver, and displays the production plan, wherein the planning module processing unit updates the production plan upon receipt of newly input demand data, and the displayed production plan transforms from a previously displayed production plan to a current production plan.

3. The system according to claim 1, wherein the demand receiver comprises a plurality of demand input modules, each of which are associated with a different demand source.

4. The system according to claim 3, wherein the demand input modules include at least one input device.

5. A production planning system for allocating production capacity to meet a demand, comprising:
   a demand receiver configured to receive input demand data;
   a demand consolidator processing unit in communication with the demand receiver and configured to calculate a consolidated demand as a sum of all input demand data upon receipt of input demand data by the demand receiver;
   a capacity balancer processing unit for calculating and storing a production capacity; and
   a planning module processing unit configured to create a production plan by allocating production capacity to meet the consolidated demand based on the consolidated demand and the production capacity, wherein
   the demand consolidator processing unit includes a product information storage module that stores assembly operation requirement data and part requirement data associated with required assembly operations and parts for production of each of a plurality of product types,
   the demand data includes product type data, and
   the demand consolidator processing unit expands the consolidated demand to an expanded consolidated demand which is a summation of the assembly operation requirement data and part requirement data based on the input product type data and the stored assembly operation requirement data and part requirement data.

6. The system according to claim 5, wherein the production capacity includes operational capacity and part capacity, and
   the planning module processing unit allocates operational capacity to meet the assembly operation requirement data of the expanded consolidated demand, and part capacity to meet the part requirement data of the expanded consolidated demand.

7. The system according to claim 6, wherein each of the plurality of demand input modules include a display configured to display at least one of:
   the input demand data from other demand input modules, including product type data;
   the consolidated demand and expanded consolidated demand, including product type data, assembly operation requirement data, and part requirement data; and
   the capacity data, including operational capacity and part capacity.

8. The system according to claim 1, wherein
   the production capacity calculated and stored by the capacity balancer processing unit comprises a standard production capacity and a maximum production capacity greater than the standard production capacity, and
   the planning module processing unit allocates production capacity to meet the consolidated demand while minimizing allocation of capacity greater than the standard production capacity.

9. The system according to claim 1, wherein the production capacity includes at least one of a total production capacity, an allocated production capacity, and an available production capacity.

10. The system according to claim 1, wherein the planning module processing unit creates the long-range production sub-plan so as to minimize a variation from a target production capacity usage.

11. The system according to claim 3, wherein the capacity balancer processing unit further comprises a plurality of capacity input modules configured for input of production capacity data.

12. The system according to claim 1, further comprising a communication channel between the demand consolidator processing unit and the planning module processing unit, wherein said communication channel is configured to transfer the consolidated demand to the planning module.

13. The system according to claim 5, further comprising a communication channel between the demand consolidator processing unit and the planning module processing unit, wherein said communication channel is configured to transfer the consolidated demand and the expanded consolidated demand to the planning module.

14. A method for planning production, comprising:
   receiving input demand data on at least one input device;
   calculating a consolidated demand by summing all input demand data using a demand consolidator processing unit;
   creating a production plan by allocating production capacity to meet the consolidated demand based on production capacity and the consolidated demand using a planning module processing unit, wherein the production capacity has a standard level and a maximum level greater than the standard level, and the production plan is created so as to minimize production capacity allocation greater than the standard level.

15. The method according to claim 14, wherein the input demand data is received by the demand consolidator processing unit from a plurality of demand input modules, each of which are associated with a different demand source.

16. The method according to claim 14, further comprising:
    expanding the consolidated demand using the demand consolidator processing unit to an expanded consolidated demand including assembly operation and part requirements to meet the consolidated demand.

17. The method according to claim 16, wherein the production capacity includes operational capacity and part capacity, and the operational capacity and part capacity are allocated to meet the expanded consolidated demand.

18. A method for planning production, comprising:
    receiving input demand data on at least one input device;
    calculating a consolidated demand by summing all input demand data using a demand consolidator processing unit;
    creating a production plan by allocating production capacity to meet the consolidated demand based on production capacity and the consolidated demand using a planning module processing unit, wherein the production plan includes a short-range production sub-plan and a long-range production sub-plan; and
    balancing production capacity usage in the long-range production sub-plan so as to minimize a variation of production capacity usage.

19. The method according to claim 14, wherein creating the production plan comprises:
    creating an initial production plan ensuring that production capacity is allocated to meet the consolidated demand; and
    balancing the initial production plan to create an operational production plan wherein production capacity allocation over the standard level is minimized.

20. The method according to claim 17, further comprising a step of updating production capacity.

* * * * *